United States Patent [19]

Lagerman

[11] Patent Number: 4,736,479

[45] Date of Patent: Apr. 12, 1988

[54] METHOD AND COVER BOARD FOR HARVESTING HONEY IN FREE BEEKEEPING

[76] Inventor: Björn A. L. Lagerman, Liljendal, S-71700 Storå, Sweden

[21] Appl. No.: 840,953

[22] Filed: Mar. 17, 1986

[30] Foreign Application Priority Data

Mar. 25, 1985 [SE] Sweden ........................... 8501454

[51] Int. Cl.$^4$ ..................... A01K 47/02; A01K 47/06
[52] U.S. Cl. ................................................ 6/1; 6/2 R; 6/11
[58] Field of Search .................... 6/1, 2 R, 4 A, 10, 11

[56] References Cited

U.S. PATENT DOCUMENTS

| | | | |
|---|---|---|---|
| 1,154,176 | 9/1915 | Danzenbaker | 6/2 R |
| 1,426,551 | 8/1922 | Cress, Jr. | 6/11 |
| 1,911,466 | 5/1933 | Powell | 6/1 |
| 2,340,219 | 1/1944 | Hawkins | 6/2 R |
| 4,546,509 | 10/1985 | Huetter | 6/1 |

Primary Examiner—Robert P. Swiatek
Attorney, Agent, or Firm—Young & Thompson

[57] ABSTRACT

A method of beekeeping in which a super is placed on a queen excluder positioned over the brood chamber of a bee colony, the super having a bottom cover and a top cover board which are provided with slots and which are initially loosely fitted. Comb mid-ribs or comb foundations, are suspended from profiles whose upper surfaces lie flush with the upper edge surfaces of the box, so that the top cover board is supported by the profiles. The bottom cover board and top cover board are identical to one another, being smooth on one side and having circumferential frame and a supporting plate of similar thickness on the other side thereof, such as to form a horizontal space of 8-14 mm between two mutually adjacent supers. The invention also relates to such top and bottom cover boards.

4 Claims, 1 Drawing Sheet

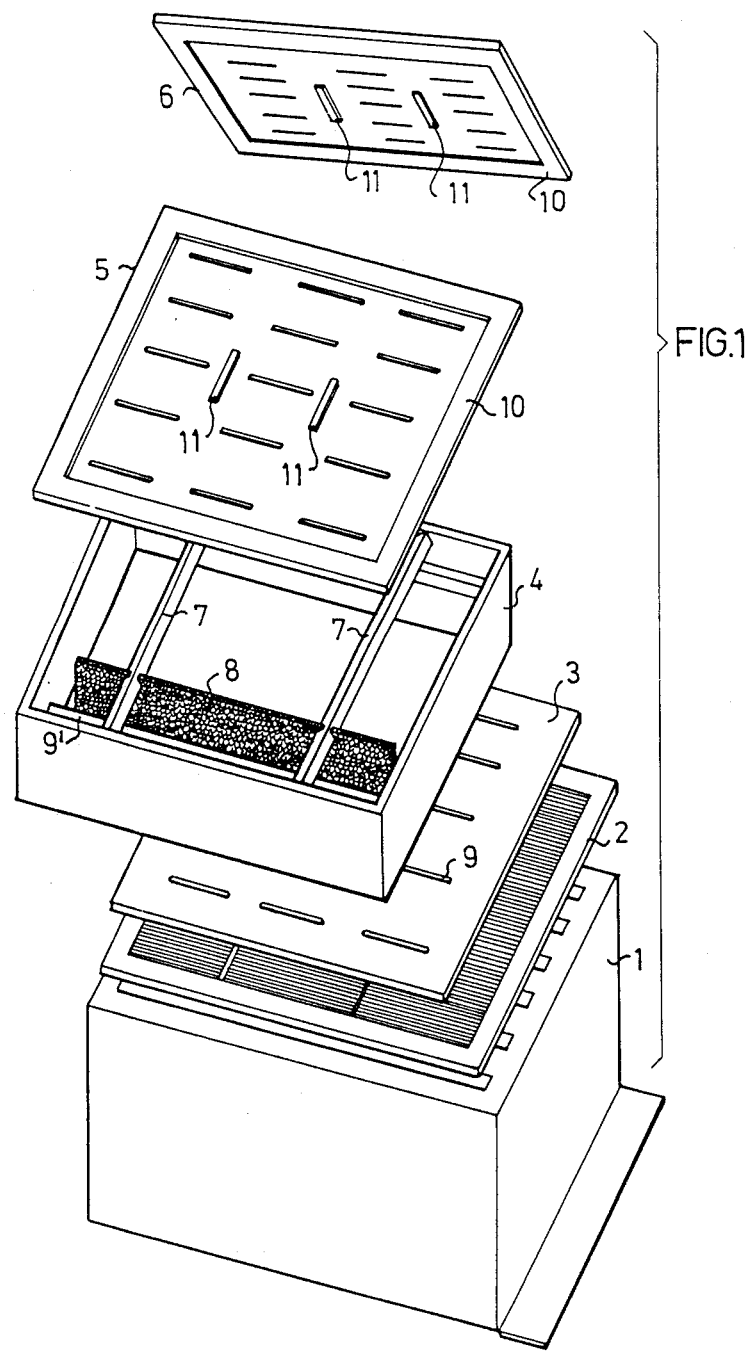

METHOD AND COVER BOARD FOR HARVESTING HONEY IN FREE BEEKEEPING

The invention relates to free beekeeping and to a method of harvesting honey in free beekeeping. Historically, free beekeeping is the most original of the beekeeping methods and is based on the intention that the bees themselves build their own honeycombs entirely unaided, the honey being harvested by locating the honeycombs and pressing, crushing, and draining the same in order to gather the honey contained therein. At the end of the nineteenth century, free beekeeping in woven straw hives was supplanted by the use of frame hives in which bees are induced to build their honeycombs in frames, which can be moved in the apiary or hive. The frames can then be uncapped and centrifuged in a honey extractor. Honey of high quality can be obtained in this way, and it is considered that bees can collect more honey when they are able to collect anew in the the frames with old honey comb without needing to produce so much wax. When beekeeping in accordance with a system devised by me, frames are used solely for the brood box or chamber, while the supers placed in storeys above the brood box are arranged so that bees are able to build honeycombs without assistance, these honeycombs being later removed and taken home, where they are crushed or similarly disintegrated to separate the honey from the wax.

I have made a super storey system intended for this purpose the subject of Swedish patent application Ser. No. 8306989-8, which at the time of filing the present application was not available to the public. The present invention relates to an improvement of this system. An object of the present invention is to provide a super storey system for free beekeeping which is convenient and practical in use, both when placing supers in position and when removing the same, and when removing the filled honeycombs in order to gather honey and wax therefrom.

These objects and other advantages are achieved in accordance with the invention with a method according to claim 1 and with the use of a cover board according to claim 4.

It is a fundamental concept of my beekeeping that the bees themselves build combs for one-time use in supers, where the beekeeper assists the bees in their construction work by fitting pieces of comb mid-ribs, or comb foundations, in the hive. This work of fitting the hive with pieces of comb mid-ribs is facilitated by the invention as defined in the main claim. When using suitable, mutually separate horizontal walls for the bottom and top cover boards, it is possible to utilize conventional supers, the lateral measurements of which in the stacking method coincide with those of the brood boxes used. The use of relatively low supers is recommended, however, e.g. heights in the order of 10–20 cm. When no frames are used, there is, after all, no longer the need for unitary height measurements or depths, and hence low supers are used in preference, with regard to the convenience of both the bees and the beekeeper. A full super with frames of classic low-normal type (German type) weighs about 35 kg and represents in this context a troublesome burden.

In accordance with a preferred embodiment of the method, the comb mid-ribs or foundations are suspended with the aid of aluminium L-shaped sections, which can be readily pressed end-first by hand through a stack of comb mid-ribs and form their own holes. The L-sections are then placed in sunken grooves or the like in the super, the roof-top angles of the L-sections being effective to serve as supports for a thin top board on which a further super can be placed, provided that the top board and the bottom board of the super are perforated with openings through which the bees can pass.

Bees have a natural tendency to build honey cells wherever they find space (so-called wild honeycomb building), and to fill in narrow openings with propolis. It has been observed that there is a space width at which bees will neither build honey cells nor yet fill in the space, in the absence of drafts. In the case of European races, this distance measures from about 8 to 14 mm. In accordance with one aspect of the invention this characteristic of bees is utilized to ensure that the supers are not built into one another to form a monolithic structure. This is achieved by spacing the top cover of an underlying super at a suitable distance from the underside of an overlying super so as to provide a so-called bee space, this being achieved by providing the mutually facing surfaces of the aforesaid supers with a respective edging frame, which abut one another, and by placing a plate of small thickness close to the respective centres of the mutually opposing surfaces, so as to abut one another. The cover boards, which may be made of masonite having slot openings punched therein, or may be made entirely of a plastics material, need not be particularly robust or strong, since the loadbearing capacity of the boards is obtained through the L-profiles supporting the comb mid-ribs. When the boards are made of a plastics material, the top boards are conveniently made of transparent plastics, to enable the amount of honey produced to be observed.

It has been found that bees build or connect together the top board, bottom board and the super vertical walls, with honeycombs, so that a full super forms a mechanically strong monolithic block. When the honey is extracted, which takes place at a lower temperature than the temperature prevailing in the bee colony, e.g. 20° C., the wax becomes somewhat brittle, so that the top and bottom covers can be readily prized loose with a knife and the support L-profiles removed, whereafter the comb structure can be dumped straight into a container, for example the funnel of a grinding mill, and the combs disintegrated. The wax, which is lighter than the honey, can then be separated by centrifugation from the honey or removed therefrom simply by sedimentation. Alternatively, whole pieces of the honeycomb can be packaged for sale in its untreated state, as a product highly appreciated by consumers in many countries.

The invention will now be described in more detail with reference to a non-restrictive exemplifying embodiment of the invention illustrated in the accompanying drawing, the single Figure of which is an exploded view of an apiary or bee-hive.

In a tested system, DADANT (TM) frame-dimensions were used for the brood box or chamber; DATANT frame-dimensions are not presently used in Sweden because frame-operated supers then become so heavy that they are difficult to handle singlehanded without the aid of auxiliary devices. The invention, however, can be applied with brood boxes of other occurring frame dimensions, such as low-normal, Svea, Wieslander, Norse, etc. Large frame dimensions are recommended, however, in view of the fact that the super frames can be made small in height and therefore convenient to handle, even when full of honey.

The apiary illustrated schematically in an exploded view comprises a brood box or chamber 1 incorporating an alighting board and frames, the brood box being used as winter living quarters. Since frames are not used in supers, therewith excluding, for example, methods comprising the elevation of brood or progeny to higher storeys in the hive, brood combs must be renewed in the brood chamber in a particular order, preferably with several combs each year, for example during Autumn comb manufacture. When supers are to be arranged in storeys, a conventional queen excluder 2 is placed on the brood box 1 and a super 4 is placed on top of the queen excluder 2. A super constructed in accordance with the system of the invention comprises a base cover 3, a box 4 without top or bottom, and a top cover board 5. The drawing also shows the base cover board 6 of a super lying immediately above the brood box. Naturally, although not shown, the uppermost super is fitted with a removeable top cover board.

The boards 3,5 and 6 are mutually similar, but are turned to face in mutually different directions, and each exhibits a smooth face and a face on which edging strips are placed around the circumferential edges thereof to form an edging frame and on which two support plates 11 are placed, the edging strips and the support plates having mutually the same thickness. The boards 3,5 and 6 of the illustrated embodiment are made of masonite having a thickness of 3.5 mm, with the edging frame 10 and support plates 11 being made of the same material, and have punched therein slot openings 9 which are intended to lie opposite the comb passageways between the honeycombs subsequently built by the bees. A suitable comb spacing is 25–45 mm, depending upon the desired thickness of the combs. Thick combs are perhaps of most interest, since they contain a smaller proportion of wax. The slot openings may have a width of 8–10 mm, to provide a comfortable entrance for the bees. If desired, the slot openings may be made sufficiently narrow for the cover boards to function as queen excluders, although with the risk that the bees will join one board to the other.

For the sake of illustration only one wax comb mid-rib 8 or comb foundation, is shown in the box 4, this comb mid-rib being suspended from two L-sections 7 which rest against a ledge 9' milled to a depth such that the upper edge of each section lies flush with the upper edge of the box 4. The smooth face of the cover board 5 can then rest against the sections. The support plates 11 located on the opposite face of the cover plate are preferably positioned opposite the strips 7, so as to be supported from beneath. The bottom board 6 of a further super can then be placed on the top board 5, wherewith good support is obtained through the agency of the mutually facing edging frames 10 and support plates 11 of respective boards. This reduces the risk of the cover boards bowing or sagging, while maintaining the boards at a uniform constant mutual distance such as to reduce to a possible minimum the inclination of the bees to cement the supers together. Earlier tests in which the bottom cover board of the upper super box was placed directly onto the top cover board of the underlying super box resulted in the supers being cemented together, making it difficult to separate the supers, one from the other.

Although only one comb mid-rib has been shown, it will be understood that one such mid-rib is provided for each comb desired. The comb mid-ribs 8 are suitably packaged in bundles and transported to the bee-hive suspended in bundles, whereafter they are distributed over the space available in the box, subsequent to placing the box in position. The height of the comb mid-ribs or foundations is practically equal to the height of the box 4, so that the bees are able to build directly on the comb mid-ribs and escape the necessity of "building banks" of bees holding onto one another.

The top and bottom cover boards may have slightly chamfered edges or corners (not shown), to enable a knife or like instrument to be inserted between the box 4 and boards 3 and 5 respectively, in order to prize the boxes apart. This latter procedure is effected at room temperature, at which the smooth sides of respective boards are readily released from the comb structure. The supporting strips 7 can be readily loosened, by using the end of a similar strip section to scrape clean the upper surfaces of the strips, whereafter they can be lifted off. The box 4 can then be readily emptied by striking the frame, causing the contents of the box to be dumped, for example, into a mill.

When harvesting the honey, the bees present in a super can be readily removed therefrom, by placing the super on a suitable support surface by the side of the brood box. It would appear that since no progeny or queen bee, liable to excrete pheromones, is to be found in the super, there is a total lack of colony spirit, and the bees quickly fly to the alighting board of the brood box. At least this is what seems to happen in practice, since the bees "flee" and the box becomes empty of bees within the space of 10–15 minutes.

Thus, the present invention provides an easily managed system for the production of honey. As a result of the convenient construction of the bottom and top cover boards of the super box, the boxes are substantially prevented from being cemented to one another and to the brood box, which affords a valuable advantage. The system is also simple and inexpensive. It also enables honey-filled super boxes to be readily collected from a large number of beekeepers for common treatment, since the material from which the boxes are made can be readily disinfected so as to eliminate the risk of spreading bees diseases, which has hardly been possible in the case of known, conventional beekeeping.

In addition, the system is particularly suited for remote bee apiaries, since the balance between wax requirement and honey requirement is such as to obtain a certain reduction in swarming. It is also possible to spread the apiaries around more effectively, which is to be desired in view of the fact that a collection of colonies in excess of about ten (10) makes husbandry difficult to carry out in practice, since the opening and control of each colony make neighbouring colonies more and more uneasy as the work progresses. As a result of the more convenient handling of the hives or apiaries in accordance with the invention, it is possible to spread the bee colonies geographically, which is also a factor for providing better harvests.

I claim:

1. A method in honey-producing beekeeping, in which a super having frameless wax comb mid-rib pieces mounted vertically therein and provided with a bottom cover board and top cover board is placed over a queen excluder above a brood chamber of a bee colony, and in which rows of apertures are formed in the bottom cover board and preferably in the top cover board at a distance corresponding to the honey-comb desired mutual distance, characterized in that the frameless wax comb mid-rib pieces are provided with openings through which there are inserted profiles which are placed across the box and supported in recesses formed in the upper edges of said box, said recesses having a depth corresponding to the cross-sectional size of the profiles, so that the uppermost surfaces of the profiles lie flush with the upper edge surfaces of the box so as to support the top cover board from beneath when placing said box in position.

2. A method according to claim 1, characterized in that the inwardly facing surfaces of the bottom cover board and top cover board are smooth; and in that the opposite sides of respective covers are provided with a circumferentially extending spacer edge having a depth corresponding to half the space distance at which bees will neither tend to build wild combs or to fill the space with propolis, and are also provided in the centre thereof with a further spacer of the same thickness as the edge spacer, thereby enabling two boxes to be placed on top of one another in the apiary without being cemented together in a manner which renders them difficult to separate when lifting one from the other.

3. A method according to claim 2, wherein said spacer edges and said further spacers have a thickness of from 2–7 mm.

4. A method according to claim 1, characterized in that the profiles have the form of aluminium L-sections placed with the angle facing upwards, the holes in the frameless wax comb mid-rib pieces being punched to a corresponding shape, and the resulting filled honey combs being released by scraping wax from the upper surfaces of the strips.

* * * * *